US011658745B2

(12) United States Patent
Magri et al.

(10) Patent No.: US 11,658,745 B2
(45) Date of Patent: May 23, 2023

(54) DISPERSION COMPENSATION (71) Applicant: Telefonaktiebolaget LM Ericsson (publ), Stockholm (SE)

(72) Inventors: Roberto Magri, Genoa (IT); Sergio Mosti, Genoa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/423,014

(22) PCT Filed: Jan. 15, 2019

(86) PCT No.: PCT/EP2019/050960
§ 371 (c)(1),
(2) Date: Jul. 14, 2021

(87) PCT Pub. No.: WO2020/147938
PCT Pub. Date: Jul. 23, 2020

(65) Prior Publication Data
US 2022/0077930 A1 Mar. 10, 2022

(51) Int. Cl.
*H04B 10/2513* (2013.01)
*H04B 10/079* (2013.01)

(52) U.S. Cl.
CPC ... *H04B 10/2513* (2013.01); *H04B 10/07951* (2013.01)

(58) Field of Classification Search
None
See application file for complete search history.

(56) References Cited

U.S. PATENT DOCUMENTS

| | | | | |
|---|---|---|---|---|
| 5,491,572 A * | 2/1996 | Ohara | | H04B 10/2589 370/242 |
| 6,268,945 B1 * | 7/2001 | Roberts | | H04B 10/564 398/201 |
| 7,233,738 B2 * | 6/2007 | Kerfoot, III | | H04J 14/0295 398/19 |
| 7,546,034 B2 * | 6/2009 | Mueller | | H04B 10/032 398/5 |
| 7,911,950 B2 * | 3/2011 | Edsall | | H04B 10/07953 370/230 |
| 7,986,878 B2 * | 7/2011 | Saunders | | H04B 10/541 398/25 |

(Continued)

FOREIGN PATENT DOCUMENTS

EP 1855399 A1 11/2007
WO WO 2008087564 A2 7/2008

OTHER PUBLICATIONS

Medhi, Von Neumann Architecture, 2012 (Year: 2012).*
(Continued)

*Primary Examiner* — Jai M Lee
(74) *Attorney, Agent, or Firm* — Sage Patent Group (57) ABSTRACT A method of dispersion compensation for an optical link includes establishing communication using a first symbol rate over the optical link, determining a dispersion compensation for the optical link based on the communication at the first symbol rate, and establishing communication using a second symbol rate over the optical link using the determined dispersion compensation, wherein the second symbol rate is higher than the first symbol rate.

18 Claims, 4 Drawing Sheets

(56) References Cited

U.S. PATENT DOCUMENTS

| | | | | |
|---|---|---|---|---|
| 8,428,457 | B2* | 4/2013 | Mizutani | H04Q 11/0067 |
| | | | | 398/43 |
| 8,897,655 | B2* | 11/2014 | Essiambre | H04L 1/0003 |
| | | | | 398/209 |
| 9,184,847 | B2* | 11/2015 | Luo | H04L 12/287 |
| 10,211,920 | B1* | 2/2019 | Khaleghi | H04B 10/25253 |
| 10,257,596 | B2* | 4/2019 | Swinkels | H04Q 11/0003 |
| 10,715,888 | B2* | 7/2020 | Swinkels | H04Q 11/0003 |
| 2004/0184813 | A1* | 9/2004 | Mikami | H04B 10/25133 |
| | | | | 398/147 |
| 2008/0089700 | A1* | 4/2008 | Takahashi | H04B 10/25133 |
| | | | | 398/208 |
| 2009/0196602 | A1 | 8/2009 | Saunders et al. | |
| 2014/0193161 | A1* | 7/2014 | In De Betou | H04Q 11/0062 |
| | | | | 398/154 |
| 2020/0213009 | A1* | 7/2020 | Okada | H04B 10/5161 |
| 2021/0328670 | A1* | 10/2021 | Murakami | H04W 76/11 |

OTHER PUBLICATIONS

International Search Report and Written Opinion of the International Searching Authority, PCT/EP2019/050960, dated Oct. 11, 2018, 12 pages.

* cited by examiner

DISPERSION COMPENSATION

CROSS REFERENCE TO RELATED APPLICATIONS

This application is a 35 U.S.C. § 371 national stage application of PCT International Application No. PCT/EP2019/050960 filed on Jan. 15, 2019, the disclosure and content of which is incorporated by reference herein in its entirety.

TECHNICAL FIELD

Examples of the present disclosure relate to dispersion compensation, for example in an optical link.

BACKGROUND

Optical communication links, using one or more optical fibers, may be used for high speed communication. For example, a fronthaul transport segment of a cellular (e.g. Long Term Evolution, LTE, and/or 5G) communication system may use optical links. In some examples, Dense Wavelength Division Multiplexing (DWDM) may be used. An example of an optical communications link may use a single carrier and PAM-4 modulation with a baud rate (e.g. symbol rate) of at least 50 Gbaud, giving a bit rate of at least 100G bits per second. At such a symbol rate, chromatic dispersion may be significant and may affect timing of symbols transmitted over the optical link and/or induce inter-symbol interference. In an example receiver, timing tolerance may be limited to few tens of ps (e.g. +/−50 ps in an example receiver). Due to this constraint, precise dispersion compensation may be needed for the optical link. In some cases, typical dispersion compensation modules (DCMs) may not be suitable if their granularity is much wider than the required compensation accuracy. Therefore, a Tuneable Chromatic Dispersion Compensator (TCDC) may be used. However, in some cases, the TCDC may require manual tuning, or the TCDC may be stepped through a number of different compensation values until reliable communication using the optical link can be achieved. In other cases, additional hardware may be installed at each end of the optical link to measure dispersion of the optical link and control the dispersion compensation.

SUMMARY

One aspect of the present disclosure provides a method of dispersion compensation for an optical link. The method comprises establishing communication using a first symbol rate over the optical link, and determining a dispersion compensation for the optical link based on the communication at the first symbol rate. The method also comprises establishing communication using a second symbol rate over the optical link using the determined dispersion compensation, wherein the second symbol rate is higher than the first symbol rate.

Another aspect of the present disclosure provides apparatus for dispersion compensation in an optical fiber. The apparatus comprises a processor and a memory. The memory contains instructions executable by the processor such that the apparatus is operable to establish communication using a first symbol rate over the optical link, determine a dispersion compensation for the optical link based on the communication at the first symbol rate, and establish communication using a second symbol rate over the optical link using the determined dispersion compensation, wherein the second symbol rate is higher than the first symbol rate.

A further aspect of the present disclosure provides apparatus for controlling dispersion compensation in an optical fiber. The apparatus is configured to establish communication using a first symbol rate over the optical link, and determine a dispersion compensation for the optical link based on the communication at the first symbol rate. The apparatus is also configured to establish communication using a second symbol rate over the optical link using the determined dispersion compensation, wherein the second symbol rate is higher than the first symbol rate.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
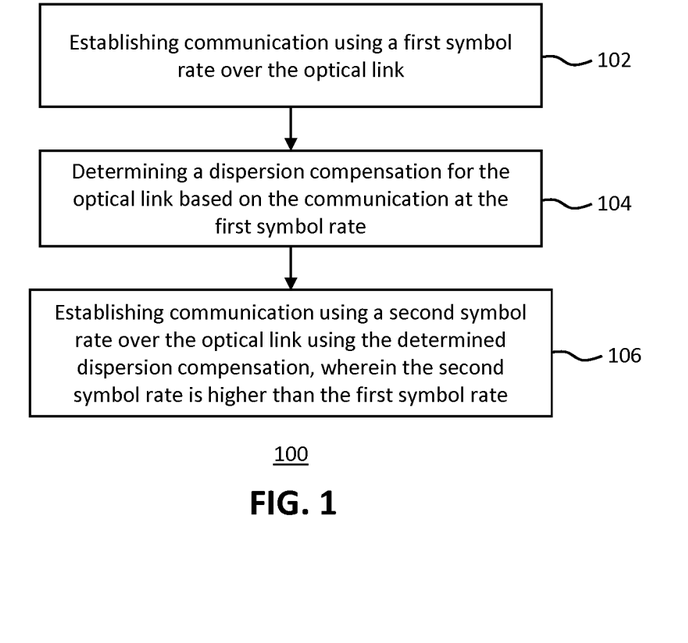
FIG. 1 is a flow chart of an example of a method of dispersion compensation for an optical link.

FIG. 1 is a flow chart of an example of a method 100 of dispersion compensation (e.g. chromatic dispersion compensation) for an optical link. The method 100 may be implemented for example by a node at either end of the optical link, or by another node such as a network controller or other network node. The method 100 comprises, in step 102, establishing communication using a first symbol rate over the optical link. This may in some examples comprise achieving frame synchronisation with a node at the remote end of the optical link, for example where the method 100 is carried out by a node at one end of the optical link. In some examples, establishing communication using the first symbol rate may comprise establishing a connection between the nodes at either end of the optical link. In some examples, a node at an end of the optical link may comprise a transceiver, transmitter or receiver, or may comprise an intermediate node such as a router or switch. In some examples, the optical link may comprise a single optical fiber, whereas in other examples the optical link may comprise multiple optical fibers, spliced together and/or traversing one or more optical switches/routers.

The method 100 also comprises, in step 104, determining a dispersion compensation for the optical link based on the communication at the first symbol rate. For example, one or more communications may be sent using the optical link using the first symbol rate, and a property of the communication may be measured or determined. This property may be used to determine dispersion compensation for the optical link. For example, the property may be used to determine (e.g. measure or estimate) the dispersion of the optical link (e.g. at the frequency or frequencies used by the communication using the first symbol rate).

In step 106, the method 100 comprises establishing communication using a second symbol rate over the optical link using the determined dispersion compensation, wherein the second symbol rate is higher than the first symbol rate. Thus, for example, a lower speed communication can be established and used to determine the dispersion compensation, and the dispersion compensation may then allow communication using the second, higher, symbol rate to be established. In some examples, the dispersion determined in step 104 may be used to set the dispersion compensation to compensate for the dispersion. In some examples, the dispersion compensation may be determined automatically without any manual intervention by a user or network operator, for example.

Figure 2:
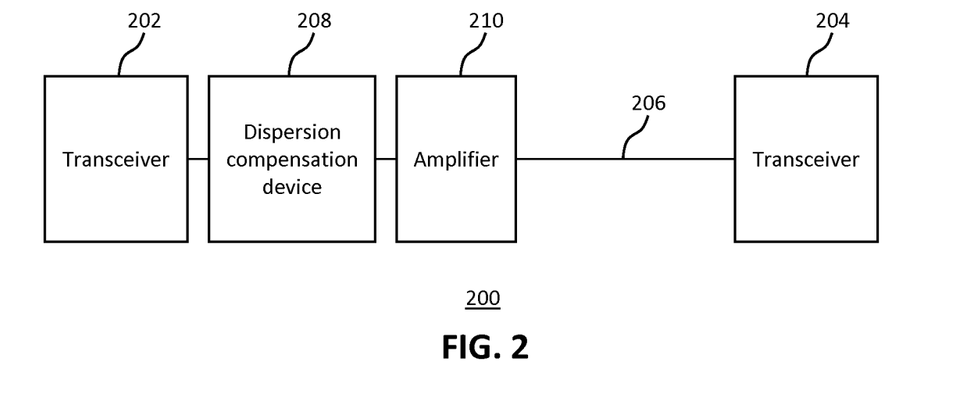
FIG. 2 is a schematic of an example of a communication system.

FIG. 200 is a schematic of an example of a communication system 200, for example a system in which the method 100 of FIG. 1 may be implemented. The communication system 200 includes a first transceiver 202 and a second transceiver 204 connected by an optical link 206. The communication system 200 also includes a dispersion compensation device 208 (e.g. Tunable Chromatic Dispersion Compensator, TCDC) to provide dispersion compensation for the optical link 206. An amplifier 210 may also be present to amplify signals on the optical link 206. In some examples disclosed herein, where a transmitter and receiver are referred to, the transmitter may be either transceiver 202 or 204, and the receiver may be the other transceiver.

In some examples of the method 100 of FIG. 1, determining the dispersion compensation may comprise determining a latency of the communication using the first symbol rate, and determining dispersion of the optical link based on the latency. The dispersion compensation may then be set for example to compensate for the dispersion. In some examples, the latency may be determined by sending a message or other communication over the optical link at the first symbol rate, and measuring the time until a response is received. The round trip time (RTT) may then be used to determine the latency. In some examples, the latency along with other characteristics such as the length of the optical link and/or a property of the optical link such as the dispersion coefficient (e.g. of the material used in an optical fiber along the link) may be used to determine the dispersion.

Establishing the communication using the first symbol rate may in some examples comprise achieving frame synchronization with a node at a remote end of the optical link. Once frame synchronization is achieved, in some examples, communication may be possible using the optical link. Thus, for example, a property such as latency or dispersion of the optical link may be measured using communications sent at the first symbol rate over the optical link.

In some examples, the method 100 comprises controlling the dispersion compensation of the optical link to a predetermined first dispersion compensation before establishing the communication using the first symbol rate. The first dispersion compensation may be for example a "default" dispersion compensation such as 50% of the available amount of dispersion compensation. If establishing the communication using the first symbol rate then fails, the dispersion compensation of the optical link may be controlled to a second dispersion compensation different to the first dispersion compensation, and establishing communication using the first symbol rate may be reattempted. There may be further attempts at controlling the dispersion compensation and establishing communication. For example, if establishing the communication using the first symbol rate fails, the dispersion compensation of the optical link may be controlled through each of a plurality of further dispersion compensation values, and establishing communication using the first symbol rate may be reattempted, until communications using the first symbol rate are established. Thus for example the dispersion compensation may be controlled through a series of coarse steps (either sequentially or in a random or other predetermined order) until communication can be established (e.g. frame synchronization is achieved).

In some examples, establishing the second communications link comprises stopping the communication using the first symbol rate. Thus, for example, once communication using the second, higher, symbol rate is established, communications are no longer sent using the first symbol rate over the optical link.

In some examples, a Tunable Chromatic Dispersion Compensator (TCDC) is controlled to provide the dispersion compensation.

The optical link may in some examples be a protected optical link comprising a plurality of paths. For example, the protected optical link may comprise multiple optical paths from a transmitter to a receiver. Thus, for example, if one path becomes inoperable, the other path may be used. In such examples, determining a dispersion compensation for the optical link may comprise determining a dispersion compensation for each of the plurality of paths. For example, a respective amount of dispersion compensation for each path may be determined.

Establishing communication using the second symbol rate over the optical link using the determined dispersion compensation may comprise establishing communication using the second symbol rate over a first path of the plurality of paths using the dispersion compensation determined for the first path.

In some examples, establishing communication using the second symbol rate over the first path comprises controlling a dispersion compensation device to provide the dispersion compensation for the first path, and the method 100 further comprises establishing communication using the second symbol rate over a second path of the plurality of paths using the dispersion compensation determined for the second path by controlling the dispersion compensation device to provide the dispersion compensation for the second path. Thus the same dispersion compensation device (e.g. dispersion compensation device 208 shown in FIG. 2) could be used to provide dispersion compensation for both paths (e.g. not simultaneously). In other examples, each path may include a respective dispersion compensation device. Therefore, for example, the method 100 may comprise establishing communication using the second symbol rate over a second path of the plurality of paths using the dispersion compensation determined for the second path by controlling a further dispersion compensation device to provide the dispersion compensation for the second path.

In some examples, the paths of a protected optical link may include a similar or identical property such as length. In some cases, dispersion compensation determined for a first path may be used to provide dispersion compensation for the second path, without explicitly determining dispersion compensation for the second path.

Specific example embodiments will now be described below.

Example embodiments may be used within a mobile fronthaul network, but applicability can be extended to other optical links (e.g. longer point to point links). An example fronthaul scenario may exploit 100 Gbps Wavelength Division Multiplexed (WDM) transmission on a single optical fiber bidirectional link connecting a radio access network (RAN) location, where baseband processing is performed, to a remote radio location.

1000-capable communication modules may be hosted in the active fronthaul equipment (e.g. transponder unit). Furthermore, an Optical Line System (OLS) may be added to manage optical amplification and tunable dispersion compensation required to fulfil 100G PAM-4 transceiver specifications.

Embodiments disclosed herein may allow for automatic setting of a dispersion compensation device (e.g. TCDC), and may assume other parameters are properly designed (e.g. optical amplification, etc). In an example approach, the dispersion of an optical link may be estimated from the round-trip delay through the following relationship: round trip delay/2 may be used to determine the link length or distance (through the speed of light), which may be used to determine the dispersion (using the dispersion coefficient of the optical link). However, the round-trip delay may only be measurable once communication has been established, e.g. once the framed signal is synchronized and communication between the modules (transmitter and receiver) is working. This may not be possible at 100G before the dispersion compensation has been correctly set since the 100G WDM PAM-4 signal has very limited dispersion tolerance and will operate only once the dispersion compensation is properly set. Embodiments disclosed herein may overcome this problem by first setting the transceiver at startup at a lower rate (e.g. lowest rate). The dispersion tolerance scales as the square of the symbol rate, so halving the rate (for example) may allow frame synchronization even if the TCDC is not yet set.

In an example, a fronthaul optical link at a maximum length of 20 km (corresponding to the fronthaul standard latency requirement of 100 us) has a dispersion of 17 ps/nm/km. The link dispersion is then 20*17=340 ps/nm, which is outside of the 50 Gbaud (100 Gbps PAM-4) tolerance of +/−50 ps/nm. 50 Gbaud corresponds to 50G symbols per second, or the symbol rate. If the optical link is operated at 25 Gbaud, i.e. 25G symbols per second, the dispersion tolerance becomes +/−200 ps/nm. In some examples, higher symbol rates are used to achieve at least the minimum bit rate, such as for example 28 Gbaud for at least 50 Gbps and 56 Gbaud for at least 100 Gbps using PAM-4. In other examples, other symbol and/or bit rates may be used.

If the optical link includes a TCDC with a default setting of 170 ps/nm (corresponding to the half of the max distance, i.e. 10 km), for any link distance between 0 and 20 Km the resulting residual link dispersion will always be within +/−200 ps/nm and the frame synchronization is achievable at the lower symbol rate, i.e. 25 Gbaud. With communication over the optical link correctly operating at the lower rate, e.g. frame synchronization is achieved, the latency can be measured, the dispersion determined, and the correct TCDC setting applied to enable communication at the higher symbol rate, e.g. 50 Gbaud.

In some examples, the TCDC can be placed in a different subsystem (e.g. the OLS box): a standard management interface between the transceiver host subsystem (e.g. FH transponder unit) and the OLS can be used to signal the dispersion setting.

Figure 3:
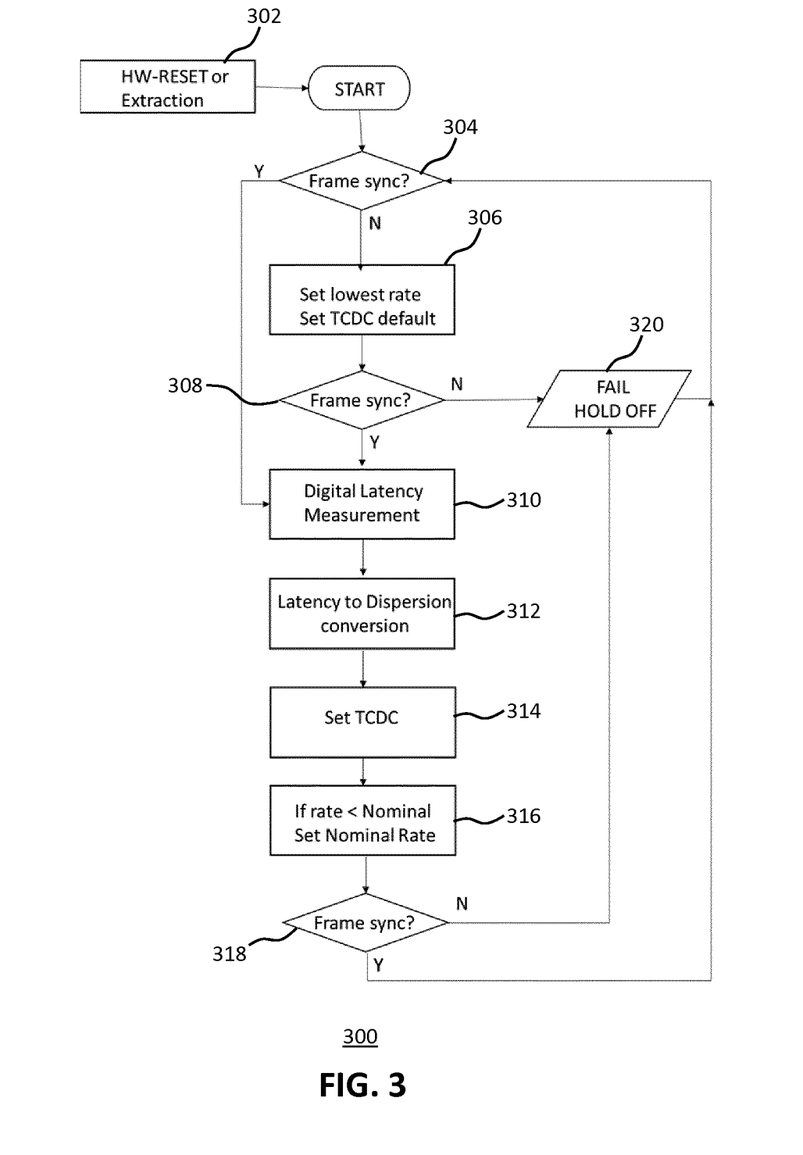
FIG. 3 a is flow chart of an example of a method of dispersion compensation.

At this point the transceivers can be switched to the higher rate, e.g. 50 Gbaud or 100 Gbit/s. A flow chart of an example of a method 300 of dispersion compensation is shown in FIG. 3.

The method 300 shown in FIG. 3 may be implemented in some examples as follows. At start-up (e.g. step 302) if there is already frame synchronization (e.g. the check in step 304) then the rate change to the lowest rate is skipped, and the method proceeds directly to e.g. step 310 for a latency measurement and then fine tuning (setting) of the dispersion compensation device (e.g. TCDC). If the frame sync fails, then the rate is changed to a lower or the lowest rate (e.g. step 306). A default dispersion compensation is used, e.g. zero or a predetermined dispersion compensation. In case the frame synchronization process fails (e.g. step 308), the method waits for a hold-off time (e.g. step 320) and then restarts (e.g. from step 304). This way, the method can in some examples operate in continuous mode. The frame synchronization check may in some examples have a given persistence to avoid traffic interruption for a short burst of errors or in case of protection switching.

If frame synchronization is obtained in 308, any suitable method is used to determine the latency of the link. The latency may be considered as corresponding to a length of dispersive medium, e.g. optical fiber. In 312, the latency is converted to an amount of dispersion of the link, or an amount of dispersion compensation required for the link. In 314, the TCDC is set to compensate for the dispersion, using the amount of dispersion or dispersion compensation calculated in 312.

In some examples, in 316, if the transmission rate is the lower rate (i.e. first symbol rate), then the transmission is changed to the nominal (i.e. higher, second symbol rate). Frame synchronization is checked in 318 at the higher rate, and using the dispersion compensation calculated at the lower rate.

In the example fronthaul scenario described above, the main transceiver may act as master according to the method 300 shown in FIG. 3. The remote transceiver (e.g. at the opposite end of the optical link) may act as slave starting at the lower rate (e.g. 25 Gbaud or 50 Gbps) and waiting for a message from the master to switch to the nominal rate.

In case the link is longer than 20 km, such as for example in a backhaul point to point scenario, and the frame synchronization may not succeed even at the lower symbol rate, the method can in some examples be modified by adding a coarse dispersion compensation scan at the lower symbol rate. Only a very limited number of steps may be needed in some examples due to the lower symbol rate being used. An example of such a modified method 400 is shown in the flow chart of FIG. 4, which is a flow chart of an example of a method 400 of dispersion compensation. In some examples, steps 402-420 may be similar or identical to corresponding steps 302-320 shown in FIG. 3. The coarse scan of dispersion compensation is shown for example as steps 422-424 in FIG. 4.

Figure 4:
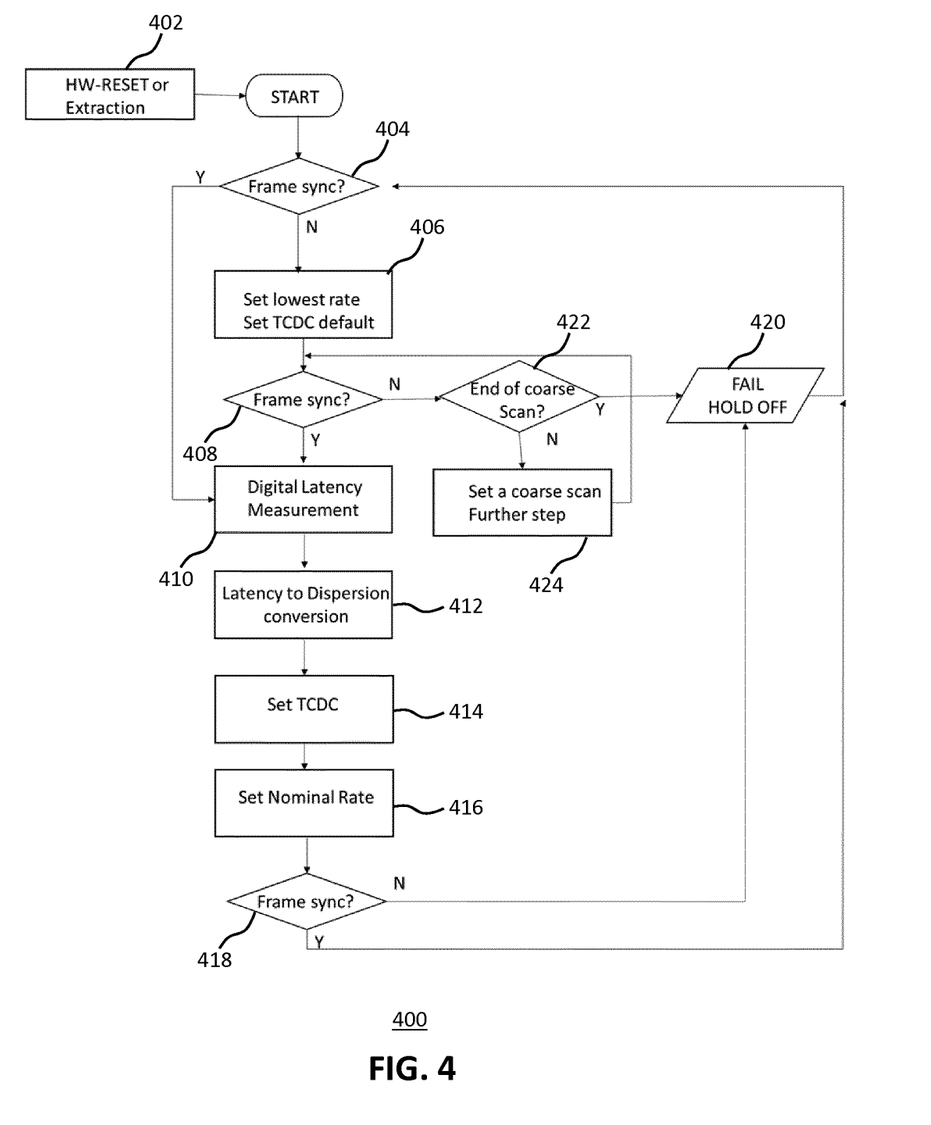
FIG. 4 is a flow chart of an example of a method of dispersion compensation.

For example, if in 408 it is determined that there is no frame synchronization, the method proceeds to 422. The coarse scan starts (not ends) for the first iteration, and so the method continues in 424, with a change to the amount of dispersion compensation applied at the TCDC. The method 400 loops to repeat an attempt to achieve frame synchronization in 408.

If frame synchronization is unsuccessful, the method continues to 422 again, and a further change to the dispersion compensation in 424. The scan, or change in dispersion compensation, may be an increase, decrease, or both, in a series of iterations of different values of the dispersion compensation. The scan provides for a plurality of different values of dispersion compensation to be used, in order to obtain frame synchronization at the lower transmission rate, i.e. first symbol rate. As such, the scan of dispersion compensations is not aiming at finding the exact correct dispersion compensation, but only a dispersion compensation which is good enough at the lower transmission rate to obtain a more accurate dispersion compensation (e.g. by measuring latency), in order to carry out transmission at the higher transmission rate. Thus, the scan can be coarse, i.e. have widely separated differences of dispersion compensation, since the scan values will not be used for the final, higher rate, transmission.

The scan ends when either frame synchronization is achieved in 408, or the scan is determined to finish in 422, in which case the hold off is implemented in 420 before re-starting.

In some examples, if a transceiver at an end of the optical link is equipped in a fronthaul system connected to radio equipment, it may be advantageous or necessary to wait until the dispersion compensation is correctly set (e.g. using a method as described herein) before the transceivers at each end of the link select a communication rate in an autonegotiation procedure. Some fronthaul implementations may include a mechanism in which a fronthaul transceiver synchronizes its communication rate with the rate of a signal from a connected client (e.g. radio or baseband client) in an autonegotiation procedure. Therefore, in some embodiments, a hold-off time for this autonegotiation may be set until after the dispersion compensation (e.g. TCDC) setting is completed according to methods disclosed herein.

In case of protected links, which include two lines or paths between the same transceivers (each path may in some cases traverse other devices such as routers and/or switches), the following two embodiments are envisaged:

1) Using separate dispersion compensation devices (e.g. TCDCs) for each line (or path) after a protection switch (which effectively selects which line is used): in this case the dispersion compensation setting procedures can operate independently on the two compensators. In some examples, at startup or commissioning, both lines are switched on at least once to determine and store the dispersion compensation settings for both dispersion compensation devices. This way, for example, if there is a fault on one line and the optical link switches to the other line, there may be no need to determine the dispersion compensation, as the stored setting can be used and applied to the appropriate compensation device.

2) Using a single common dispersion compensation device (e.g. TCDC) before the protection switch: at startup or commissioning, a switch to each line can be applied in order to determine and store a dispersion compensation setting value for both lines. This way, for example, if there is a fault on one line and the optical link switches to the other line, there may be no need to determine the dispersion compensation, as the stored setting can be used and applied to the single compensation device.

Determining dispersion compensation for each line may improve switching time at the first fault occurrence, but the procedure works even if the protection line has not been configured at the start-up. After the first switching the protection line TCDC setting will be updated anyway automatically. In fronthaul scenarios the two lines of a protected link may be symmetric and thus the dispersion compensation setting may be the same for both lines, but in other applications the lines may have different properties such as length.

In some examples, the method for setting dispersion compensation, including reducing the symbol rate, may be applied only in the case of failed frame synchronization for the higher symbol rate.

Figure 5:
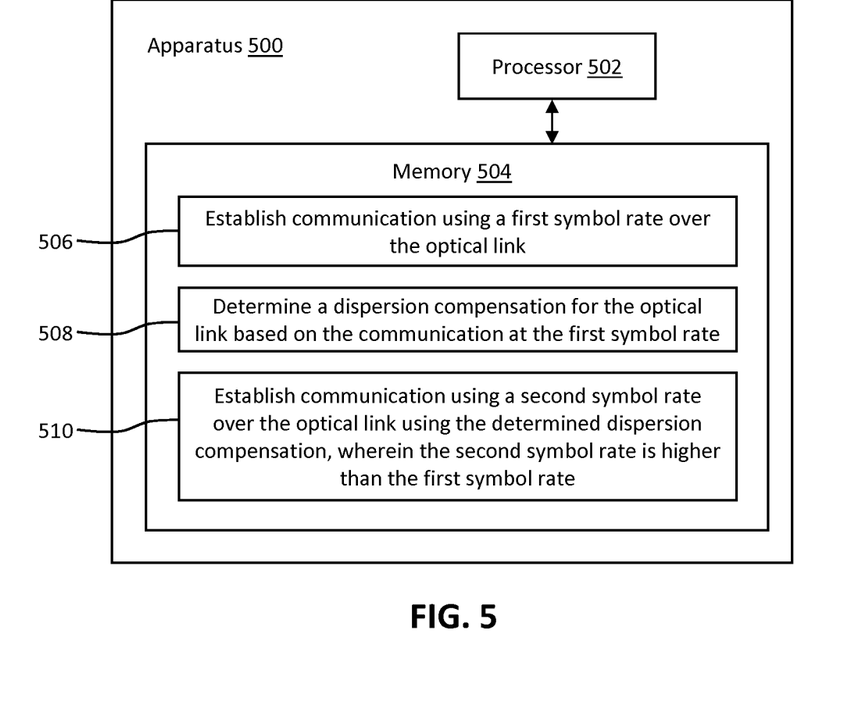
FIG. 5 is a schematic of an example of apparatus for dispersion compensation.

In some examples, latency measurement can be performed by selecting one (e.g. dedicated) transceiver or by averaging the values of more or all the transceivers. FIG. 5 is a schematic of an example of apparatus 500 for dispersion compensation. The apparatus 500 comprises a processor 50 and a memory 504. The memory 504 contains instructions executable by the processor 502 such that the apparatus 500 is operable to establish 506 communication using a first symbol rate over the optical link, determine 508 a dispersion compensation for the optical link based on the communication at the first symbol rate, and establish 510 communication using a second symbol rate over the optical link using the determined dispersion compensation, wherein the second symbol rate is higher than the first symbol rate.

Example embodiments may convey one or more of the following advantages: the ability to set dispersion compensation automatically; no requirement for any optical subsystem (e.g. to measure dispersion); transceiver modifications are required, allowing use of existing transceivers; fast setting of dispersion compensation (e.g. in embodiments that step through dispersion compensation values at the first symbol rate in a coarse manner, no fine manner is required); functionality already available in a transceiver (e.g. multiple symbol rates) and/or in a host system (e.g. latency measurement) may be exploited; an implementation may be self-confined in an active fronthaul domain (e.g. no communication with radio or baseband units).

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur

The invention claimed is:

1. A method of dispersion compensation for an optical link, the method comprising:
   establishing communication using a first symbol rate over the optical link, wherein the establishment of the communication using the first symbol rate comprises performing frame synchronization with a node at a remote end of the optical link, and if the frame synchronization fails, waiting for a hold-off time before again performing frame synchronization with the node;
   determining the dispersion compensation for the optical link based on the communication at the first symbol rate; and
   establishing communication using a second symbol rate over the optical link based on the determined dispersion compensation for the optical link, wherein the second symbol rate is higher than the first symbol rate.

2. The method of claim 1, wherein the determination of the dispersion compensation comprises determining a latency of the communication using the first symbol rate, and determining the dispersion compensation for the optical link based on the latency.

3. The method of claim 1, further comprising controlling the dispersion compensation of the optical link to a predetermined first dispersion compensation before the establishment of the communication using the first symbol rate.

4. The method of claim 3, further comprising:
   controlling the dispersion compensation of the optical link to a second dispersion compensation different to the predetermined first dispersion compensation in a case the establishment of the communication using the first symbol rate fails; and
   reattempting establishing the communication using the first symbol rate based on the controlled dispersion compensation of the optical link to the second dispersion compensation.

5. The method of claim 3, further comprising:
   controlling the dispersion compensation of the optical link through each of a plurality of further dispersion compensation values in a case the establishment of the communication using the first symbol rate fails; and
   reattempting establishing the communication using the first symbol rate until communications using the first symbol rate are established.

6. The method of claim 1, wherein the establishment of the communication using the second symbol rate comprises stopping the communication using the first symbol rate.

7. The method of claim 1, wherein the dispersion compensation comprises chromatic compensation dispersion.

8. The method of claim 1, wherein the establishment of the communication using the second symbol rate over the optical link using the determined dispersion compensation comprises controlling a Tunable Chromatic Dispersion Compensator (TCDC) to provide the dispersion compensation.

9. The method of claim 1, wherein
   the optical link is a protected optical link comprising a plurality of paths,
   the determination of the dispersion compensation for the optical link comprises determining a dispersion compensation for each of the plurality of paths, and
   the establishment of the communication using the second symbol rate over the optical link using the determined dispersion compensation comprises establishing communication using the second symbol rate over a first path of the plurality of paths using the dispersion compensation determined for the first path.

10. The method of claim 9, wherein the establishment of the communication using the second symbol rate over the first path comprises controlling a dispersion compensation device to provide the dispersion compensation for the first path, and the method further comprises:
    establishing communication using the second symbol rate over a second path of the plurality of paths using the dispersion compensation determined for the second path by controlling the dispersion compensation device to provide the dispersion compensation for the second path; or
    establishing communication using the second symbol rate over a second path of the plurality of paths using the dispersion compensation determined for the second path by controlling a further dispersion compensation device to provide the dispersion compensation for the second path.

11. An apparatus for dispersion compensation for an optical link, the apparatus comprising a processor and a memory, the memory containing instructions executable by the processor such that the apparatus is operable to:
    establish communication using a first symbol rate over the optical link, wherein the establishment of the communication using the first symbol rate comprises performing frame synchronization with a node at a remote end of the optical link, and if the frame synchronization fails, wait for a hold-off time before again performing frame synchronization with the node;
    determine the dispersion compensation for the optical link based on the communication at the first symbol rate; and
    establish communication using a second symbol rate over the optical link based on the determined dispersion compensation for the optical link, wherein the second symbol rate is higher than the first symbol rate.

12. The apparatus of claim 11, wherein the memory contains instructions executable by the processor such that the apparatus is further operable to determine the dispersion compensation by determining a latency of the communication using the first symbol rate, and determining the dispersion compensation for the optical link based on the latency.

13. The apparatus of claim 11, wherein the memory contains instructions executable by the processor such that the apparatus is further operable to control the dispersion compensation of the optical link to a predetermined first dispersion compensation before the establishment of the communication using the first symbol rate.

14. The apparatus of claim 13, wherein the memory contains instructions executable by the processor such that the apparatus is further operable to:
    control the dispersion compensation of the optical link to a second dispersion compensation different to the predetermined first dispersion compensation in a case the establishment of the communication using the first symbol rate fails; and
    reattempt establishing the communication using the first symbol rate based on the controlled dispersion compensation of the optical link to the second dispersion compensation.

15. The apparatus of claim 13, wherein the memory contains instructions executable by the processor such that the apparatus is further operable to:

control the dispersion compensation of the optical link through each of a plurality of further dispersion compensation values in a case the establishment of the communication using the first symbol rate fails; and reattempt establishing the communication using the first symbol rate until communications using the first symbol rate are established.

16. The apparatus of claim 11, wherein the memory contains instructions executable by the processor such that the apparatus is further operable to establish the communication using the second symbol rate over the optical link using the determined dispersion compensation by controlling a Tunable Chromatic Dispersion Compensator (TCDC) to provide the dispersion compensation.

17. The apparatus of claim 11, wherein the optical link is a protected optical link comprising a plurality of paths, and the memory contains instructions executable by the processor such that the apparatus is further operable to:

determine the dispersion compensation for the optical link by determining a dispersion compensation for each of the plurality of paths; and establish the communication using the second symbol rate over the optical link using the determined dispersion compensation by establishing communication using the second symbol rate over a first path of the plurality of paths using the dispersion compensation determined for the first path.

18. The apparatus of claim 17, wherein the memory contains instructions executable by the processor such that the apparatus is further operable to establish the communication using the second symbol rate over the first path by controlling a dispersion compensation device to provide the dispersion compensation for the first path, and is further operable to:

establish communication using the second symbol rate over a second path of the plurality of paths using the dispersion compensation determined for the second path by controlling the dispersion compensation device to provide the dispersion compensation for the second path; or establish communication using the second symbol rate over a second path of the plurality of paths using the dispersion compensation determined for the second path by controlling a further dispersion compensation device to provide the dispersion compensation for the second path.

\* \* \* \* \*